(12) United States Patent
Edwards et al.

(10) Patent No.: US 7,703,767 B2
(45) Date of Patent: Apr. 27, 2010

(54) INERTIAL FLATTENING FOR NOTE PROCESSING

(75) Inventors: Jerry Edwards, North Richland Hills, TX (US); Bruce Blair, Flower Mound, TX (US)

(73) Assignee: De La Rue North America, Inc., Dulles, VA (US)

( * ) Notice: Subject to any disclaimer, the term of this patent is extended or adjusted under 35 U.S.C. 154(b) by 560 days.

(21) Appl. No.: 11/560,749

(22) Filed: Nov. 16, 2006

(65) Prior Publication Data
US 2008/0116629 A1    May 22, 2008

(51) Int. Cl.
*B65H 5/00* (2006.01)
(52) U.S. Cl. .................................................. 271/264
(58) Field of Classification Search ............... 271/264; 358/498; 399/215
See application file for complete search history.

(56) References Cited

U.S. PATENT DOCUMENTS

| 5,709,293 | A | 1/1998 | Ishida et al. |
| 5,806,649 | A | 9/1998 | Walsh et al. |
| 6,512,602 | B1* | 1/2003 | Sheng et al. ............... 358/498 |
| 7,414,764 | B2* | 8/2008 | Shyu ........................ 358/498 |
| 2001/0033398 | A1* | 10/2001 | Chen ........................ 358/498 |
| 2003/0197903 | A1* | 10/2003 | Huang et al. ............... 358/498 |
| 2005/0024692 | A1* | 2/2005 | Shyu ........................ 358/474 |
| 2006/0210137 | A1 | 9/2006 | Raterman et al. |
| 2008/0030809 | A1* | 2/2008 | Itabashi et al. ............. 358/498 |

* cited by examiner

*Primary Examiner*—David H Bollinger
(74) *Attorney, Agent, or Firm*—Carstens & Cahoon LLP

(57) ABSTRACT

The present invention provides a method and apparatus for maintaining surface smoothness of note as they pass through a high speed processing machine. A note fed into the processing machine is carried through the machine by a series of conveyor belts. The note is conveyed past a line scan camera that records the note as it crosses a gap while passing from a first conveyor belt to a second conveyor belt that is approximately orthogonal to the first conveyor belt. A curved note guide directs the path of the note, helping it make the 90 degree turn as it crosses the gap between the conveyor belts. The inertia of the note causes it to remain flush against the surface of the curved guide, allowing the line scan camera to record each line of the surface of the note with equal resolution.

9 Claims, 5 Drawing Sheets

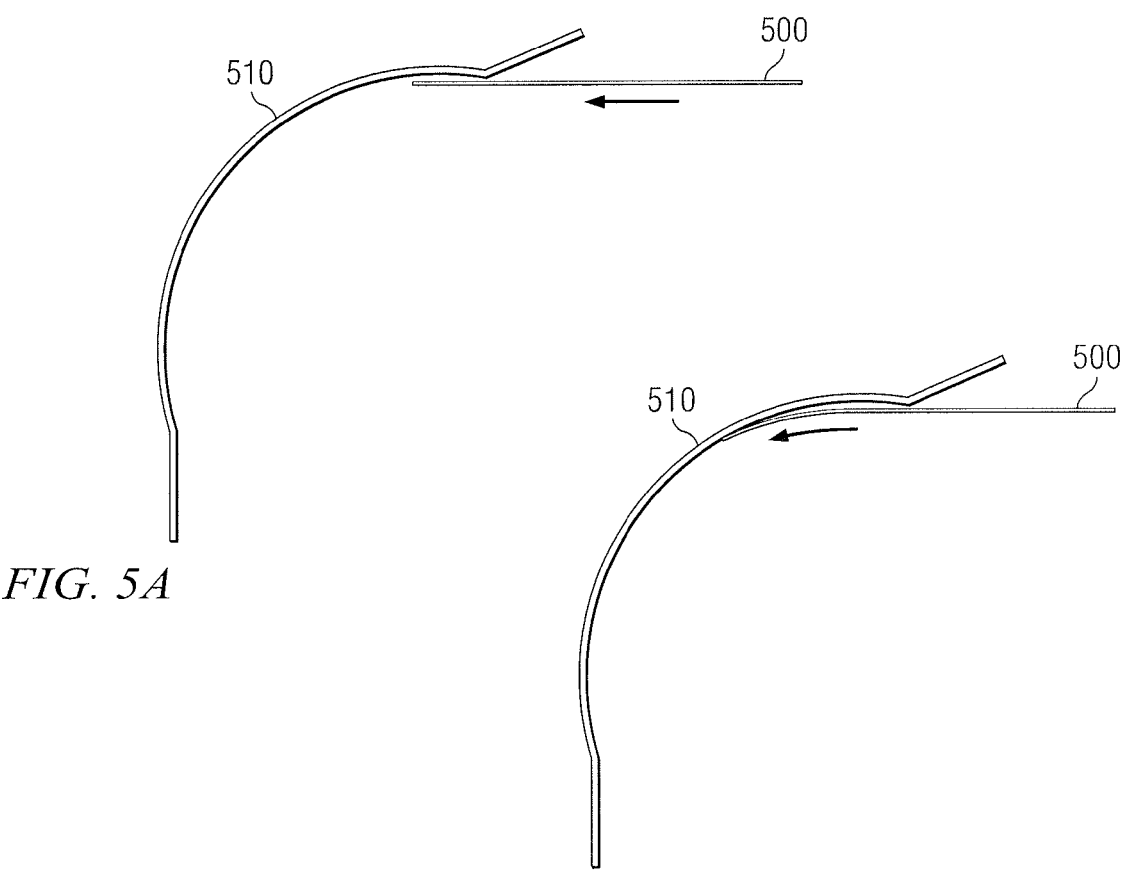
*FIG. 5A*
*FIG. 5B*
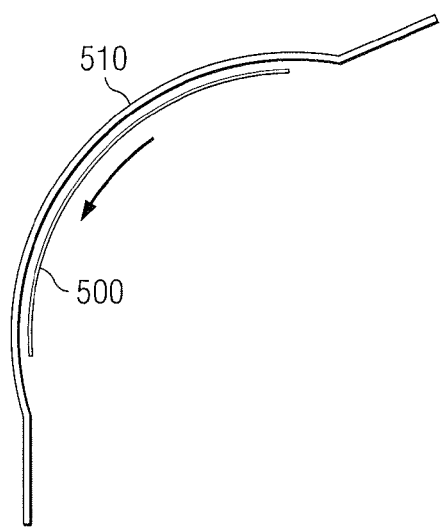
*FIG. 5C*

INERTIAL FLATTENING FOR NOTE PROCESSING

BACKGROUND OF THE INVENTION

1. Technical Field

The present invention relates generally to currency processing machines, and more specifically to a method for using inertial forces to remove creases from notes during image capture.

2. Description of Related Art

Automated, high-volume currency processing is a growing international industry affecting numerous aspects of the distribution, collection, and accounting of paper currency. Currency processing presents unique labor task issues that are intertwined with security considerations. Currency processing requires numerous individual tasks, for example: the collection of single notes by a cashier or bank teller, the accounting of individual commercial deposits or bank teller pay-in accounts, the assimilation and shipment of individual deposits or accounts to a central processing facility, the handling and accounting of a currency shipment after it arrives at a processing facility, and the processing of individual accounts through automated processing machines. Any step in the process that can be automated, thereby eliminating the need for a human labor task, saves both the labor requirements for processing currency and increases the security of the entire process. Security is increased when instituting automated processes by eliminating opportunities for theft, inadvertent loss, or mishandling of currency and increasing accounting accuracy.

A highly automated, high-volume processing system is essential to numerous levels of currency distribution and collection networks. Several designs of high-volume processing machines are available in the prior art and used by such varied interests as national central banks, independent currency transporting companies, currency printing facilities, and individual banks. In general, currency processing machines utilize a conveyer system which transports individual notes past a series of detectors. By way of example, a note may be passed through a series of electrical transducers designed to measure the note's width, length, and thickness. The next set of sensors could be optical sensors recording the note's color patterns or serial number. Detectors can likewise be used to detect specific magnetic or other physical characteristics of individual notes.

High volume currency processing machines typically pull individual notes from a stack of currency through a mechanical conveyer past several different detectors in order to facilitate the sorting of the individual notes and the accumulation of data regarding each note fed through the machine. For example, a currency processing machine can perform the simple tasks of processing a stack of currency in order to ensure that it is all of one denomination with proper fitness characteristics while simultaneously counting the stack to confirm a previous accounting. A slightly more complex task of separating a stack of currency into individual denominations while simultaneously counting the currency can be accomplished as well.

On the more complex end of prior art currency processing machines, a stack of currency consisting of various denominations can be fed into the machine for a processing that results in the separation of each denomination, a rejection of any currency that does not meet fitness specifications, the identification of counterfeit bills, and the tracking of individual notes by serial number.

Optical character recognition ("OCR") is a technology commonly used in the currency processing field for lifting the serial number or code from processed notes. OCR technology is used for identifying specific notes processed by a high speed currency processing machine by lifting a note's serial code using a camera device and then recording the serial code to the note processed.

By way of example, a stack of currency can be fed into the high speed currency processing machine. As one of the functions of the machine, an OCR device reads the serial number or code of notes passed through the machine for processing. These serial numbers can be recorded and identified to specific notes as they are processed. One of the functions of the high speed currency processor may be to sort currency by denomination and stack fit notes for bundling. As the fit notes are stacked, the data processing capabilities of the currency processing machine track the location in the stack of each currency note by serial number. For example, for a processed stack or bundle of one hundred notes in twenty dollar denominations data is accumulated that will indicate the specific serial number on each note in the stack or bundle and position of each note in the stack.

Notes are conveyed through currency processors by means of conveyor belts. Typically, several OCR cameras are placed at specific points along the travel path of the notes to evaluate the notes (denomination, fitness, counterfeit detections, etc). In order to properly read the notes, there must be a small gap in the conveyor belt so that the camera in question has a clear view of the note as it passes. As a result, the notes must jump this small gap. However, because the note is essentially flying through the air over a brief distance it has a tendency to slightly wave or "flag" in midair. This flagging is very subtle, but the effect is significant enough to alter light reflectivity and focus, thereby degrading image quality.

Therefore, a need exists for a method of reducing or eliminating creases in notes or other documents during high speed processing.

SUMMARY OF INVENTION

The present invention provides a method and apparatus for maintaining surface smoothness of note as they pass through a high speed processing machine. A note fed into the processing machine is carried through the machine by a series of conveyor belts. The note is conveyed past a line scan camera that records the note as it crosses a gap while passing from a first conveyor belt to a second conveyor belt that is approximately orthogonal to the first conveyor belt. A curved note guide directs the path of the note, helping it make the 90 degree turn as it crosses the gap between the conveyor belts. The inertia of the note causes it to remain flush against the surface of the curved guide, allowing the line scan camera to record each line of the surface of the note with equal resolution.

BRIEF DESCRIPTION OF THE DRAWINGS

The novel features believed characteristic of the invention are set forth in the appended claims. The invention itself, however, as well as the preferred mode of use, further objectives and advantages thereof, will be best understood by reference to the following detailed description of illustrative embodiments when read in conjunction with the accompanying drawings, wherein:

FIGS. 5A-5C sequentially depict the process of a note moving against the curved note guide in accordance with a preferred embodiment of the present invention.

DETAILED DESCRIPTION

Figure 1:
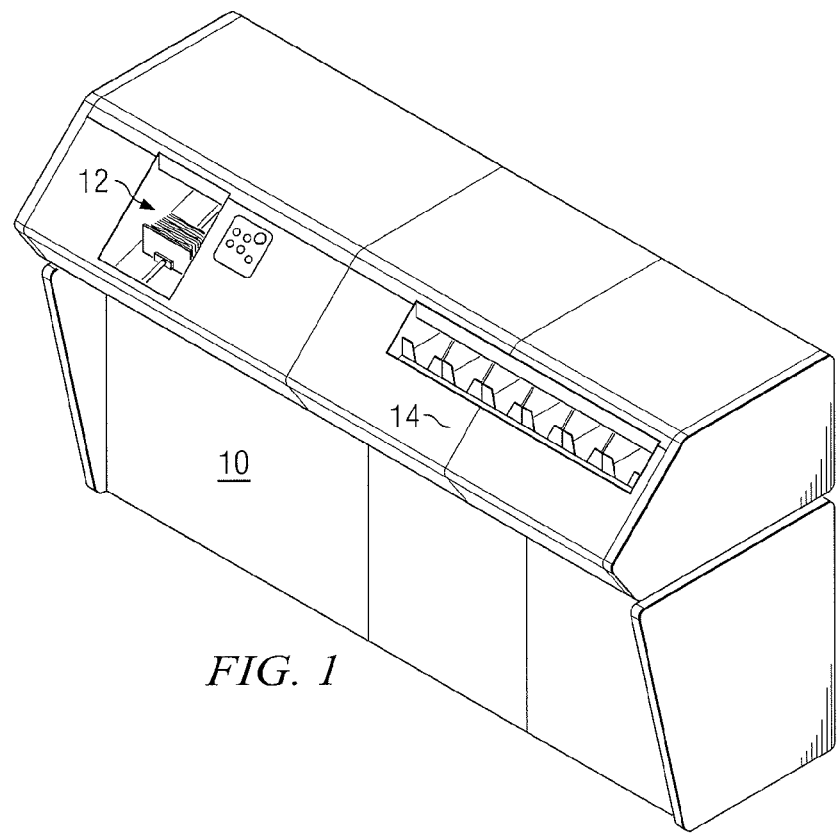
FIG. 1 shows a currency processing machine embodying the present invention and loaded with a batch feed of currency prior to starting the currency processing cycle.

FIG. 1 shows a currency processing machine 10 embodying the present invention and loaded with a batch feed of currency 12 prior to starting the currency processing cycle. This batch feed of currency 12 is fed into the currency processing machine one single note at a time. Single notes then travel on a conveyer past several different detectors before being deposited in one of the sort bins 14. Typically, a single sort bin is used to accumulate a single denomination of note at the end of the sort process.

Figure 2:
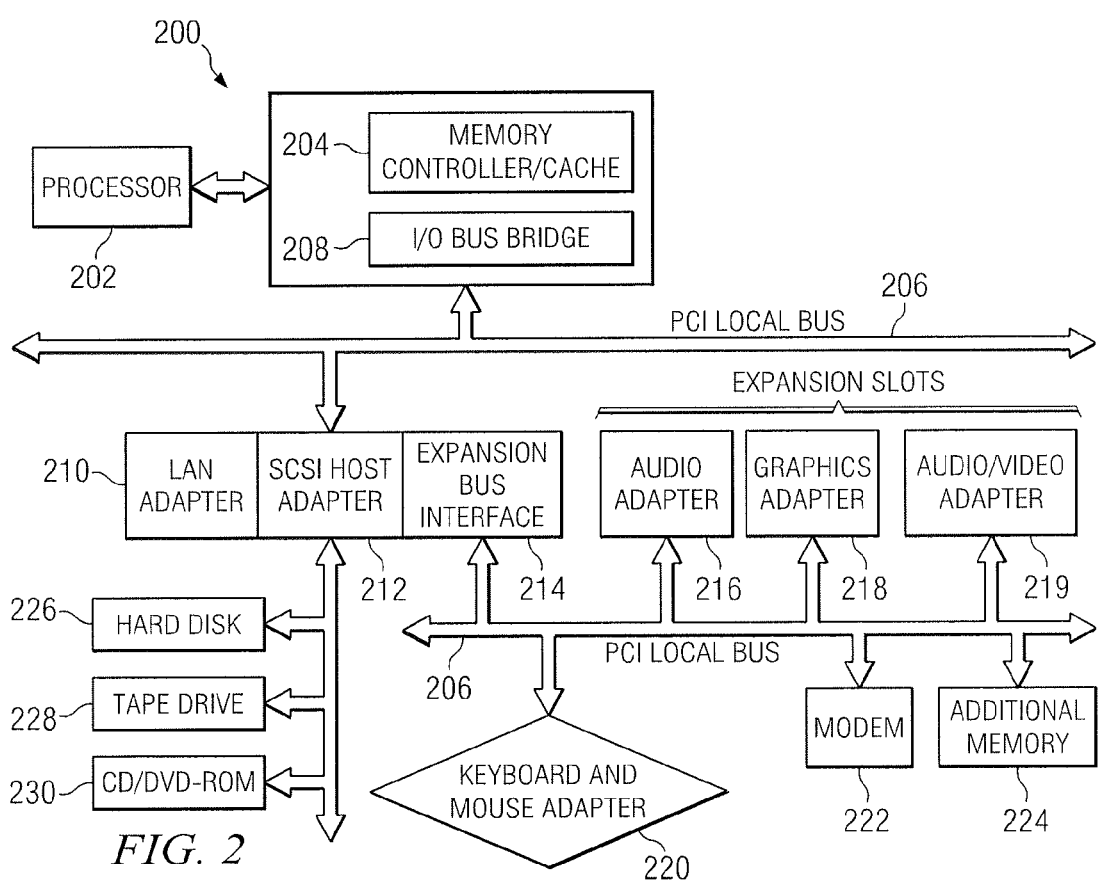
FIG. 2, a block diagram illustrating a data processing system is depicted in which the present invention may be implemented.

With reference now to FIG. 2, a block diagram illustrating a data processing system is depicted in which the present invention may be implemented. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD/DVD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

The depicted example in FIG. 2 and the above-described examples are not meant to imply architectural limitations.

Figure 3:
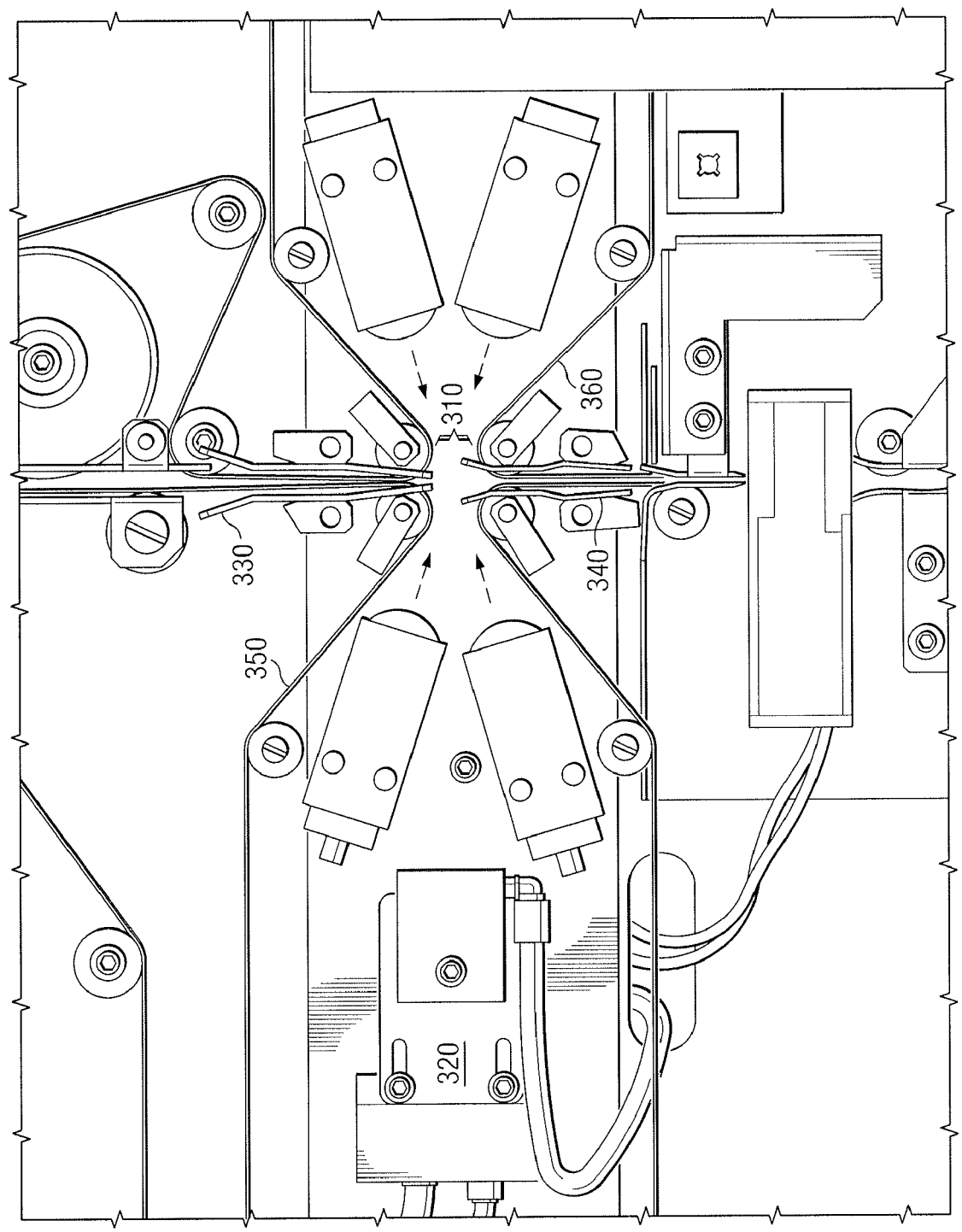
FIG. 3 shows a typical OCR camera configuration in accordance with the prior art.

FIG. 3 shows a typical OCR camera configuration in accordance with the prior art. This configuration places the camera 320 along one of the straight sections in the note travel path. As a note approaches the camera position it enters a special note feeder 330 comprised of two angled panels that help straighten and guide the note before its jump across the imaging gap. At the gap itself 310, the conveyor belt 350 turns away in both directions and the note is literally launched across the gap at high speed and caught on the opposite side by flared note guide 340 which feeds the note to the next conveyor belt 360.

The note must jump the gap 310 without the mechanical guidance of the conveyor belt so that the camera 320 has an unobstructed view of the note. Since the camera 320 is a line scan camera it does not need to view the entire note at once. However, because the note is essentially flying through the air unguided over a brief distance it has a tendency to slightly wave or "flag" in midair. This flagging is very subtle, but the effect is significant enough to alter light reflectivity and focus, thereby degrading image resolution. When one considers that modern currency processing machines may process up to 2,000 notes per minute, misreads by the camera may require subsequent reprocessing of notes, which can significantly increase the processing time for large batches of currency.

Figure 4:
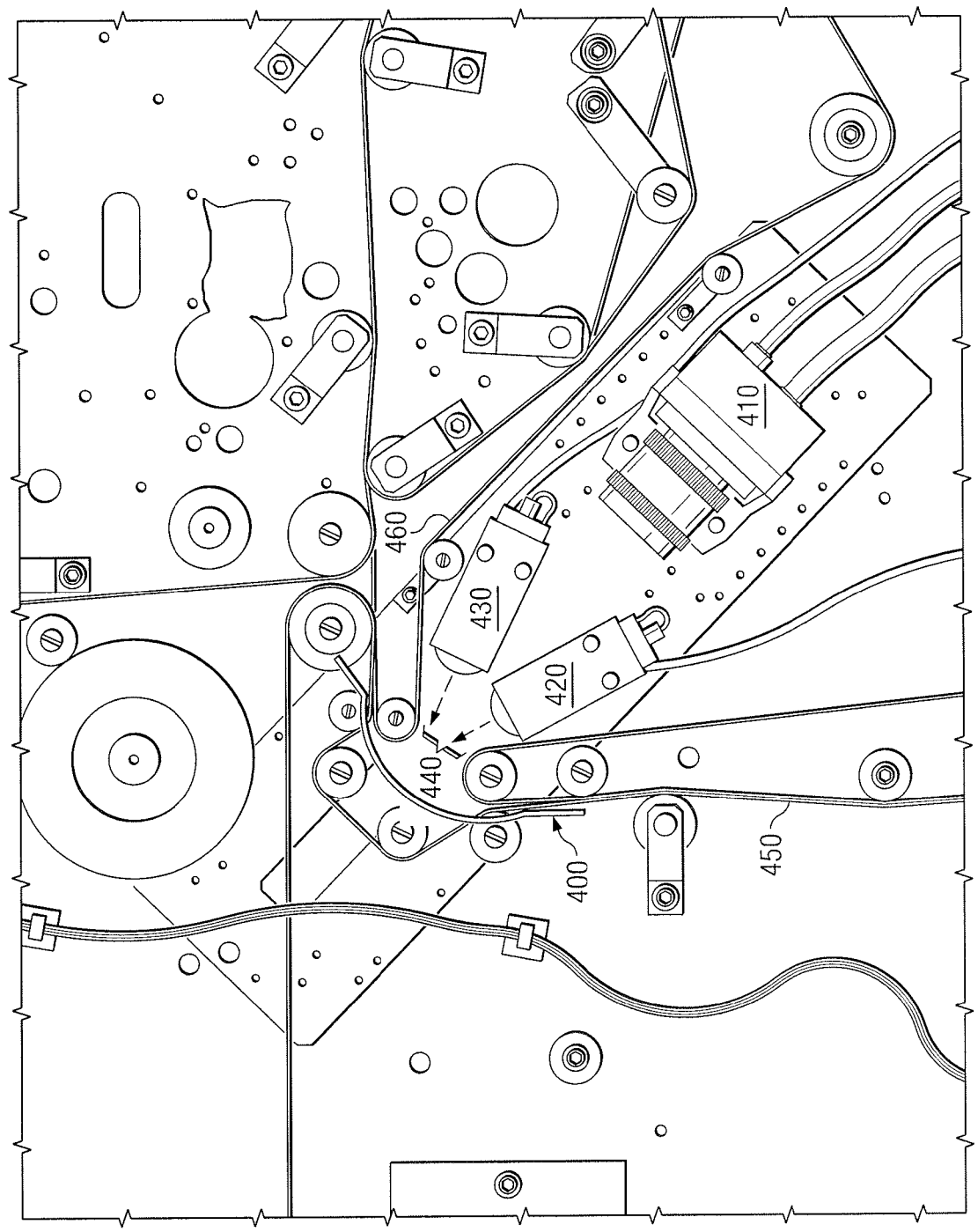
FIG. 4 shows a camera configuration that uses inertia to maintain note flatness in accordance with a preferred embodiment of the present invention.

FIG. 4 shows a camera configuration that uses inertia to maintain note flatness in accordance with a preferred embodiment of the present invention. The present invention provides a simple yet elegant solution to keeping notes flat while making the high speed jump across the gap between conveyor belts in front of the camera. Whereas the prior art requires the note to jump the gap and continue in a straight line, the present invention requires the note to change direction by approximately 90 degree in order to reach the next conveyor belt.

As shown in FIG. 4, when the note jumps the gap 440 between the first conveyor belt 460 and the next conveyor belt 450, the change in path direction is facilitated by a curved note guide 400. When a note comes into contact with the curved note guide 400 at high speed, the inertia of the note causes it to flatten against the note guide in response to the centripetal force applied by the note guide.

FIGS. 5A-5C sequentially depict the process of a note moving against the curved note guide in accordance with a preferred embodiment of the present invention. For ease of illustration, the note 500 is shown slightly spaced apart from the note guide 510, particularly in FIG. 5C. However, it should be kept in mind that during actual operation of the present invention, the note 500 will in fact lie flush against the note guide 510 as it moves along the surface. By providing a physical contact surface against which the note presses due to inertia, the note guide 510 prevents the note 500 from waving or flagging since the note is not flying freely through the air unguided, as in the prior art.

Referring back to FIG. 4, a line scan camera 410 is positioned to record notes at approximately the apex of the curvature of the note guide 400. Although not visible in this view, there is a small slit in the note guide 400 opposite the camera 410 (see FIG. 6). This slit facilitates the proper illumination of the note surface by lights 420, 430, which is necessary for proper imaging by the camera 410.

Figure 6:
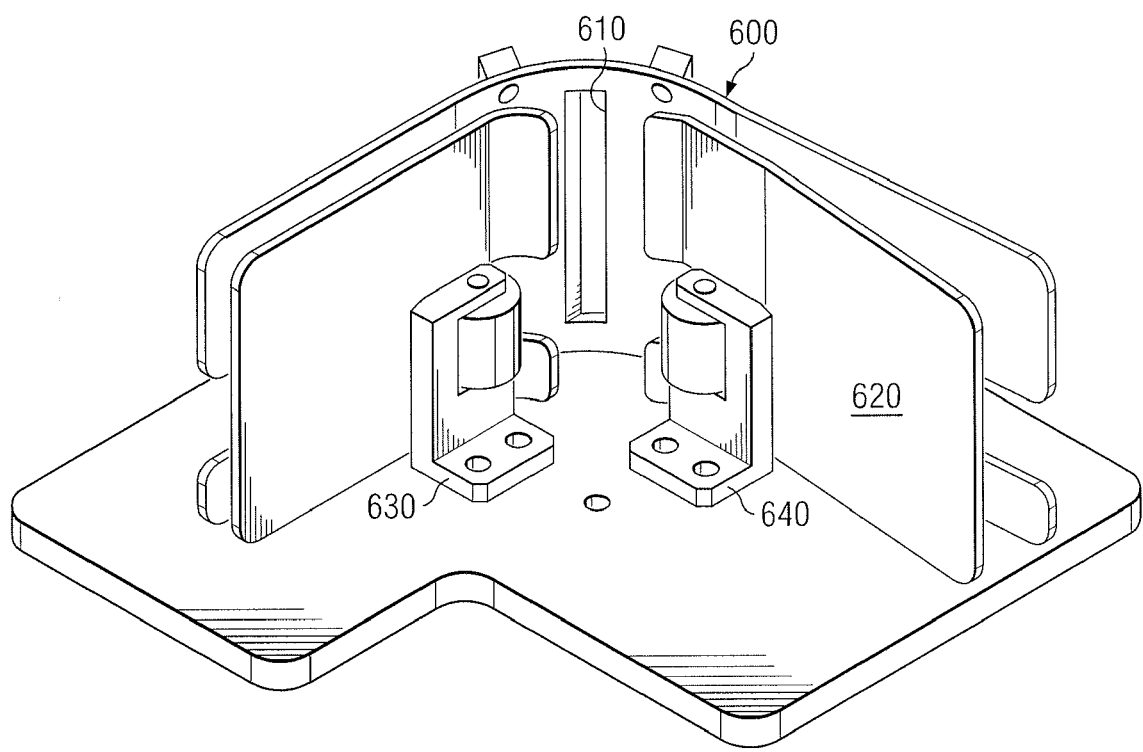
FIG. 6 shows a perspective view of the note guide.

FIG. 6 shows a perspective view of the note guide. In this view, one can see the slit 610 referenced above that allows light to pass through a passing note while it is being scanned by the line scan camera. Illumination of passing bank notes can be accomplished in two ways. The first is to reflect the light off the note by facing the light toward the concave surface of the note guide (as pictured in FIG. 4). The other method is to shine the light through the slit 610 (and through the notes) from the opposite (convex) side of the note guide 600.

The slit 610 in the note guide 600 is actually needed in both cases, with reflected light and with the light beaming through from the opposite side. While it is obvious why the slit 610 is needed when a beam of light is pointed toward the camera from the opposite side of the note guide 600 in order to create a transparency image, it is far less intuitive in the cases when the camera is reading in reflective mode. In the case of reflected light, part of the light bounces back from the note to the camera and part transmits though the banknote. If the slit 610 is not present, the light which transmits through the banknote reflects back from the surface of the note guide 600, creating undesirable light conditions for consistent imaging by the camera.

Also pictured is a flared panel 620 at the receiving end of the note guide 600. The flared panel 620 is not pictured in the embodiment shown in FIG. 4 but may be used to catch and direct notes when the conveyors are placed at a further distance from the ends of the note guide 600, requiring the notes to be launched into the note guide from a small distance. In such a configuration, guide wheels 630, 640 are used to help move the note along the surface of the note guide 600.

While the above description has specifically covered application to currency processing machines, it should be emphasized that the method of the present invention can easily be adapted for use in any situation requiring accurate, high speed image processing of paper documents.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

What is claimed is:

1. A method for maintaining surface smoothness of a document during high speed processing, the method comprising the steps of:
    (a) feeding the document into a processing machine, wherein the document is carried through the machine by a series of conveyors;
    (b) passing said document from a first conveyor to a second conveyor through a curved document guide to change the direction of the path of said document; and
    (c) using a detector to record said document as the document passes through said curved document guide;
    wherein the inertia of said document causes it to remain flush against the concave surface of the curved guide.

2. The method according to claim 1, wherein step (c) further comprises focusing said detector at approximately the apex of the curvature of said curved document guide.

3. The method according to claim 1, wherein passing the document through said curved document guide in step (b) directs the path of said document through an approximately 90 degree turn.

4. The method according to claim 1, wherein passing the document from the first conveyor to the second conveyor in step (b) comprises changing the direction of the document from a first path to a second path that is approximately orthogonal to the first path.

5. The method according to claim 1, wherein step (c) further comprises recording the document as the document crosses a space between the first conveyor and the second conveyor, wherein said space gives the detector an unobstructed view or the document.

6. The method according to claim 1, wherein step (c) further comprises using a line scan camera as the detector.

7. The method according to claim 1, wherein step (c) further comprises using one of the following as the detector:
    (a) a camera;
    (b) electrical transducers;
    (c) optical sensors;
    (d) magnetic detector.

8. The method according to claim 1, wherein causing the document to remain flush against the concave surface of the curved document guide allows the detector to record each line of the surface of the document with equal resolution.

9. The method according to claim 1, wherein the document comprises a banknote, and the high speed processing is high speed currency processing.

\* \* \* \* \*